(12) United States Patent
Henderson

(10) Patent No.: US 10,862,523 B1
(45) Date of Patent: Dec. 8, 2020

(54) AUTOMATIC FLOTATION DEPLOYMENT SYSTEM

(71) Applicant: Dustin Henderson, Waynesboro, TN (US)

(72) Inventor: Dustin Henderson, Waynesboro, TN (US)

( * ) Notice: Subject to any disclaimer, the term of this patent is extended or adjusted under 35 U.S.C. 154(b) by 0 days.

(21) Appl. No.: 16/793,024

(22) Filed: Feb. 18, 2020

(51) Int. Cl.
| | |
|---|---|
| H04M 1/00 | (2006.01) |
| H04B 1/38 | (2015.01) |
| H04W 4/30 | (2018.01) |
| H04B 1/3888 | (2015.01) |
| A45C 11/00 | (2006.01) |
| A45C 15/00 | (2006.01) |
| G08B 21/24 | (2006.01) |
| G08B 5/38 | (2006.01) |

(52) U.S. Cl.
CPC ............ H04B 1/3888 (2013.01); A45C 11/00 (2013.01); A45C 15/00 (2013.01); G08B 5/38 (2013.01); G08B 21/24 (2013.01); A45C 2011/002 (2013.01); A45C 2011/003 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,710,989 | A * | 1/1998 | Flood | B63C 9/0005 200/61.05 |
| 7,056,179 | B2 * | 6/2006 | Courtney | B63C 9/0005 441/90 |
| 8,311,595 | B2 * | 11/2012 | Takatsuka | H04M 1/0202 455/575.1 |
| 9,154,593 | B1 | 10/2015 | Meldner | |
| 9,590,433 | B2 * | 3/2017 | Li | G01N 21/1717 |
| 9,614,569 | B2 * | 4/2017 | Alsberg | A45C 11/00 |
| 10,640,367 | B2 * | 5/2020 | Vummidi Murali | B81C 1/0023 |
| 2017/0003879 | A1 * | 1/2017 | Tamai | H04M 1/18 |
| 2018/0295731 | A1 | 10/2018 | Burdoucci | |

* cited by examiner

*Primary Examiner* — Quochien B Vuong
(74) *Attorney, Agent, or Firm* — Sanchelima & Associates, P.A.; Christian Sanchelima; Jesus Sanchelima

(57) ABSTRACT

An automatic flotation deployment system for mobile devices is disclosed herein. The floatation device automatically deploys when a mobile electronic device is submerged. The device includes sensors for detecting submersion in liquid, namely water. When the sensors detect submersion, automatic activation of a floatation bladder is activated as well as a signal for the mobile electronic device flashlight to begin flashing at repeated intervals. The floatation device can be located in an interior compartment in the rear of a mobile electronic device with a release door used when activated. A carbon dioxide cartridge is utilized for bladder inflation. Future versions can be manufactured for use with mobile electronic device cases.

9 Claims, 5 Drawing Sheets

AUTOMATIC FLOTATION DEPLOYMENT SYSTEM

BACKGROUND OF THE INVENTION

1. Field of the Invention

The present invention relates to an automatic flotation deployment system and, more particularly, to an automatic flotation deployment system that is mounted onto the back of a phone or phone case that automatically deploys when submerged in water.

2. Description of the Related Art

Several designs for a flotation deployment system have been designed in the past. None of them, however, include a floatation device that automatically deploys when a mobile electronic device is submersed. The device includes sensors for detecting submersion in liquid, namely water. When the sensors detect submersion, automatic activation of a floatation bladder is activated as well as a signal for the mobile electronic device flashlight to begin flashing at repeated intervals. The floatation device can be located in an interior compartment in the rear of a mobile electronic device with a release door used when activated. A CO2 cartridge is utilized for bladder inflation. Future versions can be manufactured for use with mobile electronic device cases. It is known that individuals may often accidently drop their phones into water during outdoor activities such as fishing or riding on a boat. It is also known, once the phone is submerged in water it can become extremely difficult to locate the phone within the water. Therefore, there is a need for an automatic flotation deployment system that will enable the phone to rise up to the surface where it can be easily located by the owner.

Applicant believes that a related reference corresponds to U.S. Pat. No. 9,154,593 issued for a flotation and related integrations to extend the use of electronic systems. The floatation device includes improvements in the compact integration of multi-functional, single unit electronic devices. Applicant believes that another related reference corresponds to U.S. patent No. 2018/0295731 issued for a system and method for interactive protection of a mobile electronic device. The system includes a deployable barrier and a sensor to detect when to deploy the barrier. However, the cited disclosures differ from the present invention because they collectively fail to address the novel features of the lighting alerts when the system is deployed. The lighting alerts will aid a user in locating their phone in the water during the nighttime or in murky water environments. The present invention integrates this lighting alert system and further includes additional versions that may be disposable and used with any mobile device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a flotation deployment system that aids a user in locating their mobile device in the event the device is submerged within a liquid environment.

It is another object of this invention to provide a flotation deployment system that includes a lighting alert to aid a user in locating their mobile device in environments with low visibility.

It is still another object of the present invention to provide a flotation deployment system that may be integrated into a case for a mobile device to allow for re-use of the device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
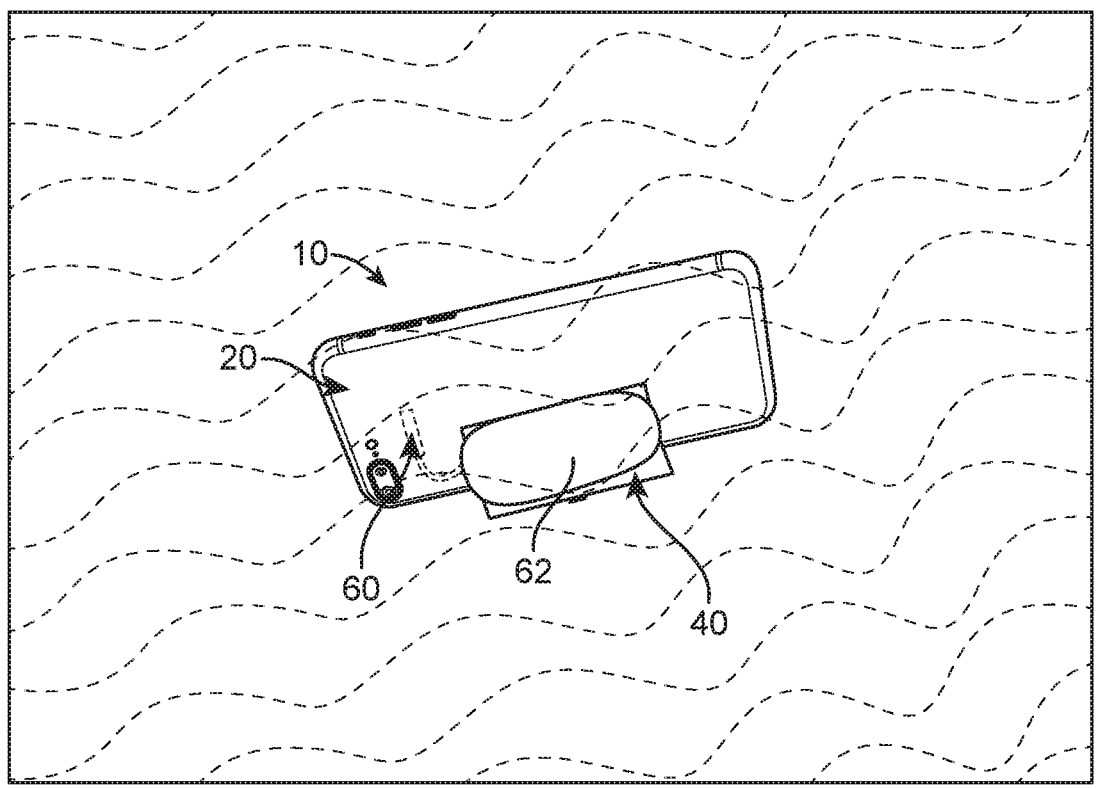
FIG. 1 represents an isometric view of flotation deployment system 10 in its operating environment in accordance to an embodiment of the present invention.
Figure 2:
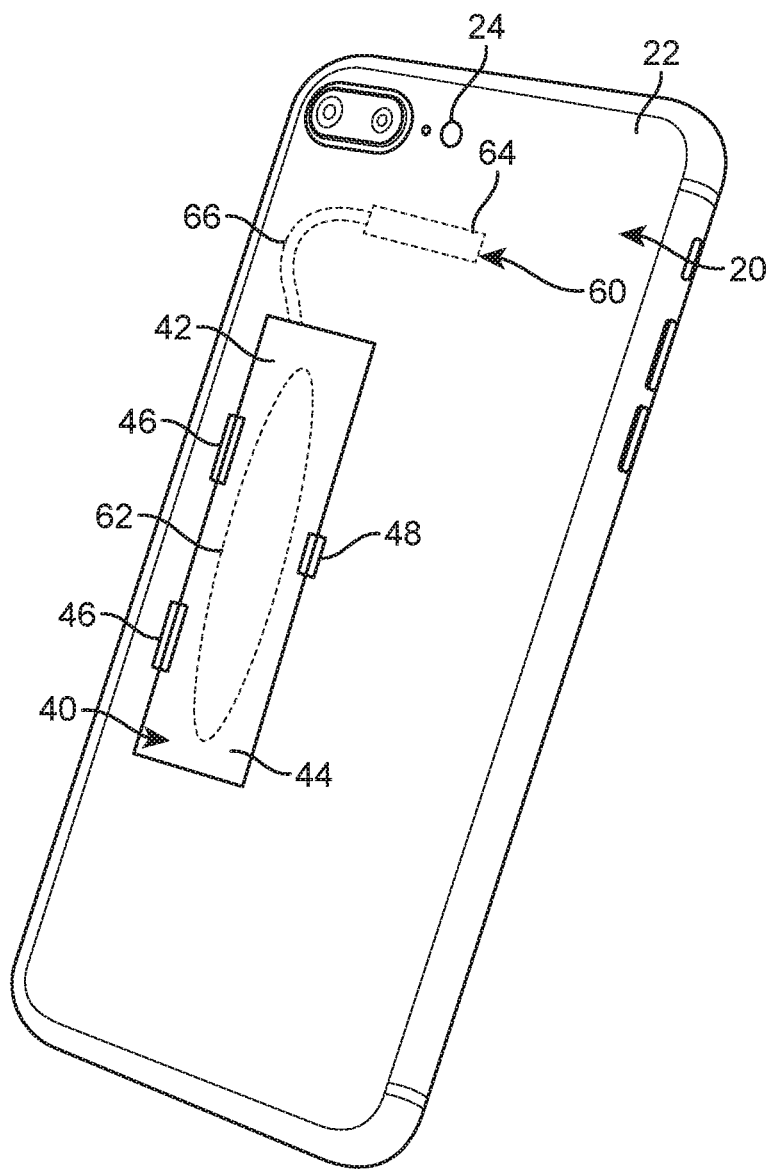
FIG. 2 shows an isometric interior rear view of mobile device 20 depicting components of housing assembly 40 and deployment assembly 60 in accordance to an embodiment of the present invention.
Figure 3:
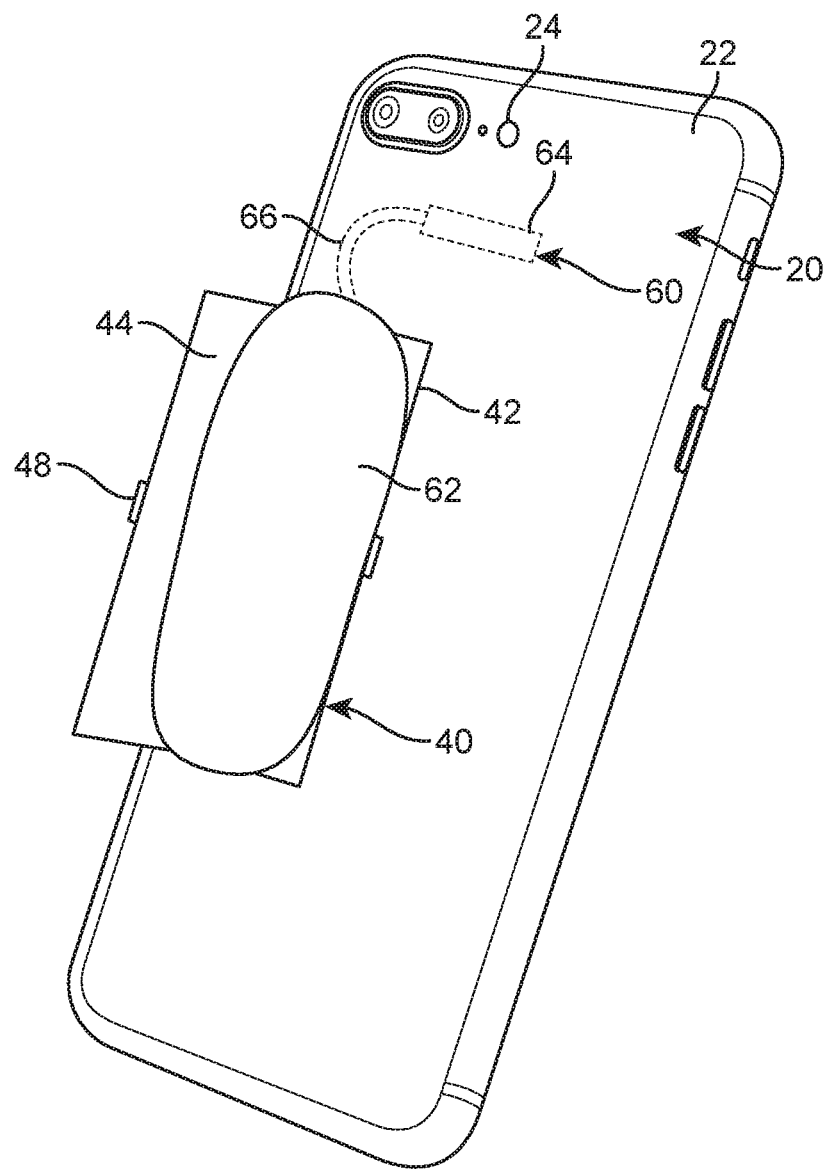
FIG. 3 illustrates an isometric rear view of mobile device 20 depicting deployment assembly 60 in an activated state in accordance to an embodiment of the present invention.
Figure 4:
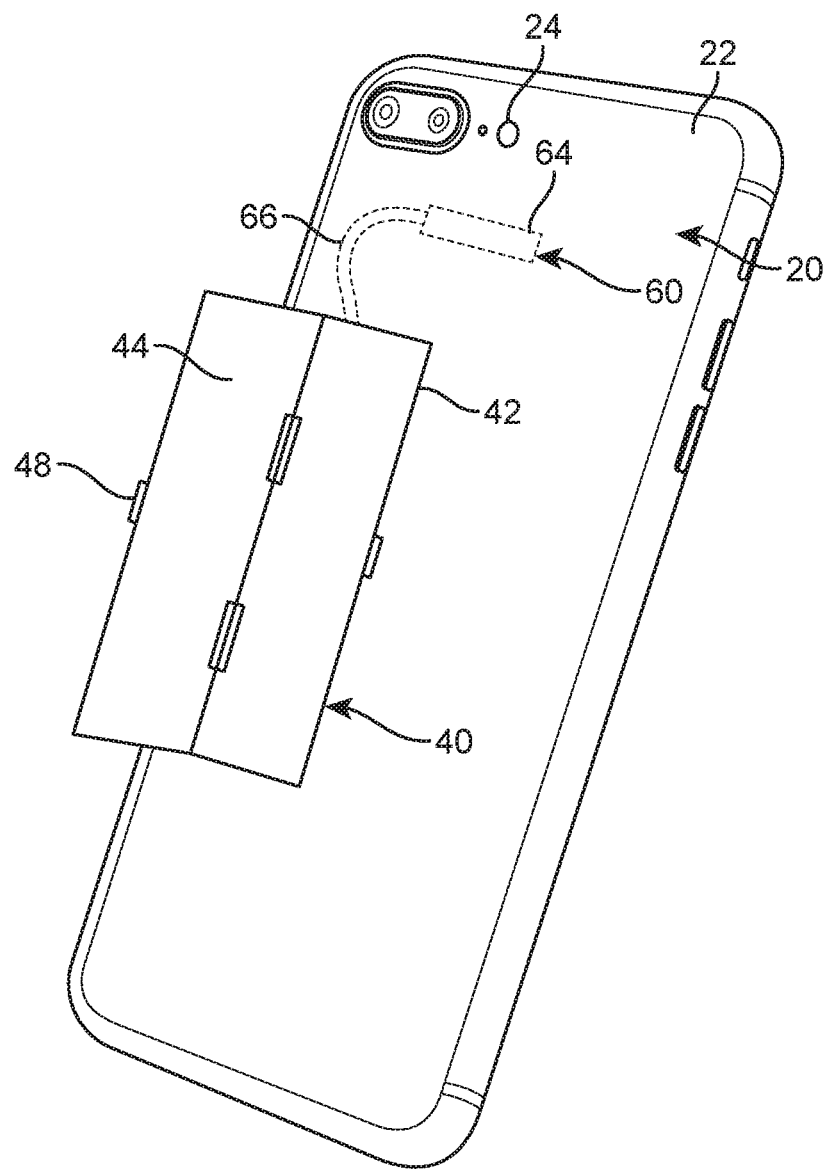
FIG. 4 is a representation of another isometric rear view of mobile device 20 showing door 44 in an open position in accordance to an embodiment of the present invention.
Figure 5:
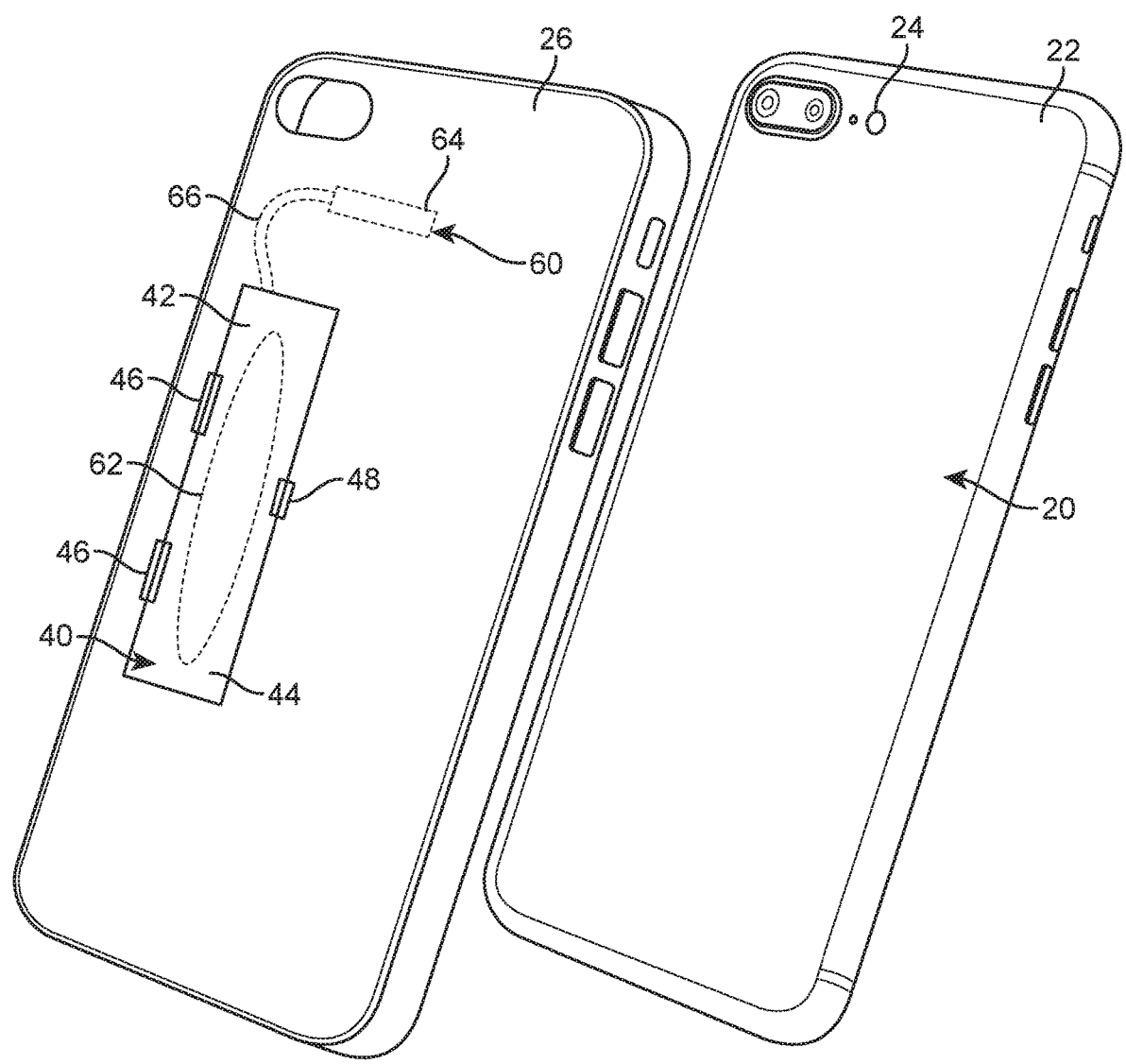
FIG. 5 shows an isometric interior rear view of a case 26 having housing assembly 40 and deployment assembly 60 integrated therein in accordance to another embodiment of the present invention.

Referring now to the drawings, where the present invention is generally referred to with numeral 10, it can be observed a flotation system 10 that basically includes a mobile device 20, housing assembly 40, and deployment assembly 60.

Mobile device 20 includes a water sensor 22 and a flash component 24. In one embodiment, mobile device 20 may be any suitable mobile device provided in today's market. This may include mobile devices such as but not limited to cell phones, tablets, laptops, and the like. Water sensor 22 may be provided as existing hardware within mobile device 20. Other embodiments may feature and external attachment water sensor 22 that is attached to mobile device 20. Additionally, water sensor 22 is configured to detect the event of mobile device 20 being submerged in a water environment. In one embodiment, water sensor 22 may detect and alert mobile device 20 when it is either partially or entirely submerged within a liquid. In a preferred embodiment, water sensor 22 may be configured to detect the presence of water. Other embodiments may feature a water sensor 22 able to detect a variety of liquids and is not limited to being only water. Furthermore, flash component 24 may be provided as an existing hardware on mobile device 20. However, an external flash component 24 may also be provided to be attached to mobile device 21. In one embodiment, flash component 24 is configured to begin flashing light once water sensor 22 detects a submersion of mobile device 20 within a liquid. Flash component 24 may provide flashing light in repeated intervals. In one embodiment, mobile device 20 may also provide audio and vibration alerts when submerged in water. Such a configuration aids a user in locating their phone in a water environment in the event that it has been submerged in a liquid. Flash component 24 proves especially useful in locating mobile device 20 in a water environment of low visibility or during the nighttime.

Housing assembly 40 a compartment 42 and a door 44 located on a back end of mobile device 20. In one embodiment, compartment 42 is located on a left side of the back end of mobile device 20. Additionally, compartment 42 may be provided in the form of a housing integrated within mobile device 20. This housing may be in the form of a rectangular shape; however, other shapes may be used. Furthermore, compartment 42 may be vertically oriented along the back end of mobile device 20. In other embodiments, compartment 42 may be oriented in other configurations along the back end of mobile device 20. Additionally, door 44 may be hingedly mounted onto compartment 42 using hinges 46. In one embodiment, the shape of door 44 matches the shape of compartment 42. Additionally, hinges 46 may be vertically mounted along one side of door 44 and allow door 44 to open and close without being removed from compartment 42. In one embodiment, door 44 remains flush with the back end of mobile device 20. In another embodiment, door 44 includes a locking mechanism 48 to aid door 44 in being secured to compartment 42. Any suitable locking member may be used for locking mechanism 48. This may include but is not limited to devices such as, snap locks, buckles, and pressure locks.

Deployment assembly 60 includes a bladder 62 housed within compartment 42 and a cartridge 64 housed within mobile device 20. In one embodiment cartridge 64 is a carbon dioxide cartridge that is rectangular in shape and located entirely above compartment 42. In one embodiment, carbon dioxide provides bladder 62 with the needed gas to inflate it to a proper density. Other embodiments may include cartridge 64 having a variety of other gases that are suitable to inflate bladder 62. Additionally, a tube 66 may be used to couple bladder 62 and cartridge 64. Tube 66 provides an airtight seal and a safe passage for the gas traveling from cartridge 64. In the present embodiment bladder 62 is entirely held within compartment 42 and is stored therein in a deflated state. In one embodiment, cartridge 64 may be actuated to fill bladder 62 when water sensor 22 detects mobile device 20 being submerged in a liquid. Once an appropriate water level is measured, cartridge 64 will begin to till bladder 62 with a carbon dioxide gas. Bladder 62 will then begin to transition into an inflated state causing the bladder to expand. Eventually, bladder 62 will expand to a point where it is exerting outward pressure on door 44. As a result of the pressure, locking mechanism 48 will then be released and door 44 will be open and allow for bladder 62 to continue to expand. Bladder 62 will continue to expand and protrude outwardly from the back end of mobile device 20. In the present embodiment, flash component 24 of mobile device will also be initiated once cartridge 66 has been activated. Flash component 24 will begin to flash in repeated intervals to aid a user tin locating their phone in the event that it has been submerged in a water environment. Flotation system 10 provides a user with the most optimized way of locating a mobile device in the unfortunate event that it has been submerged in a water environment.

In one embodiment, housing assembly 40 and deployment assembly 60 are implemented directly into mobile device 20 such as described in the above specification. In another embodiment, housing assembly 40 and deployment assembly 60 may be integrated into a case 26 for mobile device 20. This allows for a removable floatation system that may be attached onto mobile device 20. The use of case 26 further allows users to purchase replacement systems in the event that a previous system has been deployed.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automatic flotation deployment system, comprising:
    a. a mobile device having a water sensor;
    b. a housing assembly including a compartment located on a back end of said mobile device, said compartment including a door extending partially along a back surface of said mobile device, wherein said door further includes two hinges along a peripheral edge of said door to be hingedly attached to said compartment, said peripheral edge with said two hinges being adjacent to a perimeter side of said back surface of said mobile device, said door further including a locking mechanism on a peripheral edge opposite to said two hinges, wherein said locking mechanism is a pressure lock adapted to be released at a predetermined pressure, said door being flush with said back end of said mobile device, wherein said door is located entirely beneath a camera located on said back surface of said mobile device; and
    c. a deployment assembly including a bladder housed within said compartment, a carbon dioxide cartridge housed within said mobile device, a tube coupling said bladder and said carbon dioxide cartridge, said carbon dioxide cartridge is actuated to fill said bladder when said water sensor detects said mobile device being submerged in a liquid, wherein said door is forced into an open position upon experiencing an inflating force from said bladder.

2. The automatic flotation deployment system of claim 1 wherein said door is rectangular in shape.

3. The automatic flotation deployment system of claim 1 wherein said carbon dioxide cartridge is located entirely above said compartment.

4. The automatic flotation deployment system of claim 1 wherein said carbon dioxide cartridge is cylindrical in shape.

5. The automatic flotation deployment system of claim 1 wherein said bladder protrudes entirely form the back end of said mobile device when inflated.

6. The automatic flotation deployment system of claim 1 wherein said mobile device includes a flash component.

7. The automatic flotation deployment system of claim 6 wherein said flash component flashes light in repeated intervals when said carbon dioxide cartridge is actuated.

8. The automatic flotation deployment system of claim 1 wherein said compartment is positioned vertically along said back end of said mobile device.

9. An automatic flotation deployment system, consisting of:

a. a mobile device having a water sensor and a flash component located on a back surface of said mobile device;
b. a housing assembly including a compartment located on a back end of said mobile device, said compartment including a door extending partially along said back surface of said mobile device, wherein said door further includes two hinges along a peripheral edge of said door to be hingedly attached to said compartment, said peripheral edge with said two hinges being adjacent to a perimeter side of said back surface of said mobile device, said door further including a locking mechanism on a peripheral edge opposite to said two hinges, wherein said locking mechanism is selected from a group consisting essentially of a snap lock, a buckle, or a pressure lock, which are adapted to be released at a predetermined pressure, said door being flush with said back end of said mobile device, wherein said door is located entirely beneath a camera located on said back surface of said mobile device;
c. a deployment assembly including a bladder housed within said compartment, a carbon dioxide cartridge housed within said mobile device, a tube coupling said bladder and said carbon dioxide cartridge, said carbon dioxide cartridge is actuated to fill said bladder when said water sensor detects said mobile device being submerged in a liquid, wherein said door is forced into an open position upon experiencing an inflating force from said bladder, wherein said flash component begins to flash at repeated intervals when said carbon dioxide cartridge is actuated.

* * * * *